(12) United States Patent
Lamraoui et al.

(10) Patent No.: US 12,487,656 B2
(45) Date of Patent: Dec. 2, 2025

(54) SYSTEM AND METHOD FOR COMMANDING A MEDICAL DEVICE ARRANGED TO BE IMPLANTED

(71) Applicant: UROMEMS, Grenoble (FR)

(72) Inventors: Hamid Lamraoui, Vaulnaveys le Haut (FR); Marc Marien, La Tronche (FR)

(73) Assignee: UROMEMS, Grenoble (FR)

( * ) Notice: Subject to any disclaimer, the term of this patent is extended or adjusted under 35 U.S.C. 154(b) by 957 days.

(21) Appl. No.: 17/636,967

(22) PCT Filed: Sep. 22, 2020

(86) PCT No.: PCT/FR2020/051652
§ 371 (c)(1),
(2) Date: Feb. 21, 2022

(87) PCT Pub. No.: WO2021/058906
PCT Pub. Date: Apr. 1, 2021

(65) Prior Publication Data
US 2022/0357783 A1 Nov. 10, 2022

(30) Foreign Application Priority Data
Sep. 23, 2019 (FR) ........................................ 1910454

(51) Int. Cl.
*G06F 1/3234* (2019.01)
*G06F 1/3287* (2019.01)
(Continued)

(52) U.S. Cl.
CPC ............. *G06F 1/325* (2013.01); *G16H 20/40* (2018.01); *G16H 40/60* (2018.01); *G06F 1/3287* (2013.01)

(58) Field of Classification Search
CPC ........ G06F 1/325; G06F 1/3287; G06F 1/163; G06F 1/3215; G06F 1/3278; G16H 20/40;
(Continued)

(56) References Cited

U.S. PATENT DOCUMENTS

| 2002/0069885 A1* | 6/2002 | Boies ................... A61B 5/0031 128/899 |
| 2003/0092962 A1* | 5/2003 | Forsell ................ A61N 1/3787 600/29 |

(Continued)

FOREIGN PATENT DOCUMENTS

| CN | 105144170 A | 12/2015 |
| JP | 2011245235 | 12/2011 |

(Continued)

OTHER PUBLICATIONS

Hached Sami et al. "Novel, Remotely Controlled, Artificial Urinary Sphincter: A Retro-Compatible Device"; Published in: IEEE/ASME Transactions on Mechatronics (vol. 19—Issue n°4—Apr. 25, 2014—pp. 1352-1362).

(Continued)

*Primary Examiner* — Sunita Reddy
(74) *Attorney, Agent, or Firm* — Thomas | Horstemeyer, LLP

(57) ABSTRACT

The invention relates to a method and system 1) for remotely commanding a medical device (2) arranged to be implanted in a human or animal body, said command system comprising at least a first (4) and a second (5) activation element for commanding said medical device, said first activation element being arranged to be triggered by proximity to an added activation element (6), said second activation element being arranged to be triggered by pressure exerted on said second activation element, the command system being (Continued)

arranged to activate a command of the medical device upon triggering of the first and second activation elements.

26 Claims, 2 Drawing Sheets

(51) Int. Cl.
  *G16H 20/40* (2018.01)
  *G16H 40/60* (2018.01)
(58) Field of Classification Search
  CPC ........ G16H 40/60; G16H 20/60; G16H 20/70; G16H 40/63; Y02D 10/00
  USPC ...................................................... 600/29–32
  See application file for complete search history.

(56) References Cited

U.S. PATENT DOCUMENTS

| | | | | |
|---|---|---|---|---|
| 2004/0111126 | A1* | 6/2004 | Tanagho | A61N 1/36017 607/40 |
| 2004/0172087 | A1* | 9/2004 | Forsell | A61F 2/0036 607/40 |
| 2006/0142636 | A1* | 6/2006 | Meretei | A61N 2/00 600/31 |
| 2006/0211913 | A1* | 9/2006 | Dlugos | A61F 5/0003 600/37 |
| 2009/0306462 | A1* | 12/2009 | Lechner | A61B 17/1355 606/157 |
| 2011/0066254 | A1* | 3/2011 | Forsell | A61M 60/515 600/38 |
| 2011/0087337 | A1* | 4/2011 | Forsell | A61B 17/12 600/38 |
| 2018/0193130 | A1 | 7/2018 | Lamraoui | |
| 2020/0289824 | A1 | 9/2020 | Lamraoui et al. | |

FOREIGN PATENT DOCUMENTS

| | | |
|---|---|---|
| JP | 2016527057 | 9/2016 |
| WO | 2010007574 A1 | 1/2010 |
| WO | 2014123998 A2 | 8/2014 |
| WO | 201958064 A1 | 3/2019 |

OTHER PUBLICATIONS

French Search Report in co-pending, related French Application No. 877309, mailed Jul. 3, 2020.

PCT Search Report in related PCT Application No. PCT/FR2020/051652, mailed Dec. 17, 2020.

Hached, Sami et al., Novel, Remotely Controlled, Artificial Urinary Sphincter: A Retro-Compatible Device, IEEE/ASME Transactions on Mechatronics, U.S., IEEE, Apr. 25, 2014, vol. 19, No. 4, p. 1352-1362, https://doi.org/10.1109/TMECH.2013.2280575.

Office Action in related Japanese Application No. 2022-518279, mailed Sep. 10, 2024.

Japanese Office Action in related Japanese Application No. 2022-518279, mailed Mar. 18, 2025.

* cited by examiner

SYSTEM AND METHOD FOR COMMANDING A MEDICAL DEVICE ARRANGED TO BE IMPLANTED

CROSS REFERENCE TO RELATED APPLICATIONS

This application is the 35 U.S.C. § 371 national stage application of PCT Application No. PCT/FR2020/051652, filed Sep. 22, 2020, which application claims the benefit of French Application No. FR 1910454, filed Sep. 23, 2019, both of which are hereby incorporated by reference herein in their entireties.

FIELD OF THE INVENTION

The present invention relates to a system for commanding a medical device implantable in a human or animal body.

The invention relates in particular to active implantable medical devices, that is medical devices which, for their operation, rely on a source of electric energy and for which it is necessary to have an adapted command system.

BACKGROUND OF THE INVENTION

There are many medical devices implantable in a patient to perform a function in the patient's body, for example to compensate for a malfunction of a natural organ.

In particular, implantable medical devices for selectively sealing an anatomical duct are known, for example to remedy incontinence (in the case of artificial urinary and anal sphincters) or to limit entry of food into the stomach (in the case of gastric bands). Sealing of the anatomical duct is usually caused by the compression of a cuff wrapped around said duct.

Generally speaking, an artificial urinary sphincter comprises an occlusive cuff to be implanted around the urethra, possibly around the bladder neck in the case of female implants or around the prostate in the case of male implants, so as to compress the urethra in order to prevent urine leakage, especially in the case of a patient suffering from m incontinence. There is also provided a command system arranged to activate a command of the artificial sphincter, for example adjustment of the compression exerted by the cuff so as to seal or open the natural duct.

In older artificial sphincters, the medical device is arranged so that a manual action by the patient, for example pressure exerted on a pump device arranged under the skin, activates the command of the artificial sphincter.

Nowadays, more sophisticated systems are being developed to avoid the patient having to manually press the pump in order to control the cuff.

The artificial sphincter then comprises a remote command system, not implanted in the patient's body, which is adapted to activate a command of the implanted medical device, for example by realising a decrease in the pressure exerted by the cuff on the natural duct.

There are currently different types of implanted medical devices that can be remotely activated by a command system not implanted in the patient's body, for example artificial urinary sphincters, implementing different cuff technologies (hydraulic, mechanical, inflatable etc.) and different piezoelectric actuator technologies, cables etc.

It is understood that the invention is not limited to any particular implanted medical device technology.

However, implanted medical devices that can be remotely activated by a command system not implanted in the patient's body have the disadvantage that they can be wrongly, that is non-intentionally, activated by the patient. This is usually the case when the command system is accidentally manipulated, for example when the command system is in the form of a remote with a button triggering the activation of a command of the implanted medical device and this remote is placed in a pocket of the patient's trousers. In this case, a simple change in the patient's posture can lead to an unintentional pressure on the remote button and thus to the activation of a command of the medical device, for example the reduction of the pressure in the cuff and unintentional micturition of the patient.

These conditions result in very difficult situations for patients. There is therefore a need for a system for remotely commanding an implanted medical device in which unintentional commands are avoided.

DISCLOSURE OF THE INVENTION

The present invention therefore aims to remedy these drawbacks by providing a system for remotely commanding a medical device implanted in a human or animal body which activates a command only as a result of an intentional action of the patient.

To this end, the present invention provides a system for remotely commanding a medical device arranged to be implanted in a human or animal body, said command system comprising at least a first and a second activation element for commanding said medical device, said first activation element being arranged to be triggered by proximity to an added activation element, said second activation element being arranged to be triggered by pressure exerted on said second activation element, the command system being arranged to activate a command of the medical device upon triggering of the first and second activation elements.

The invention thus relates to a command system not implanted in the patient's body capable of remotely commanding a medical device implanted in the human or animal body. By implantation, it is understood that this refers to a medical device that is introduced into the human or animal body, for example during a surgical operation.

Advantageously, it will be noted that the activation of a command of the implanted medical device by triggering of two activation elements of a different nature makes it possible to significantly reduce the activation by the patient of a non-intentional command.

According to one embodiment of the invention, the command system is arranged to activate a command of the medical device upon simultaneous triggering of the first and second activation elements, whereas according to another embodiment the command system is arranged to activate a command of the medical device upon successive triggering of the first and second activation elements. Preferably successive triggering of the first and second activation element is performed in a time interval of less 1 second, preferably less than 500 than milliseconds, still preferably less than or equal to 100 milliseconds.

According to one particular embodiment of the invention, the first and the second activation element are disposed at different locations of the command system, preferably on opposite sides of the command system, whereas according to another embodiment the first and the second activation element are disposed at the same location of the command system so as to overlap.

According to one embodiment of the invention, the first activation element comprises a sensor selected from a group consisting of a tactile, resistive, capacitive, induction, infrared, optical, magnetic or fingerprint recognition sensor. Preferably, the fingerprint recognition sensor is configured to recognise at least a first succession of fingerprints to activate a first command of the medical device and at least a second succession of fingerprints to activate a second command of the medical device, the first command being different from the second command.

According to one embodiment of the invention, the added activation element is distinct from the command system and consists of a part of a human or animal body, preferably a finger, a stylus or a badge or chip, in particular magnetic or electro-magnetic.

According to another embodiment of the invention, the first activation element is arranged to be triggered by proximity to the added activation element at a distance of less than 5 millimetres, preferably less than 1 millimetre. Alternatively, the first activation element is arranged to be triggered by contact with the added activation element.

In one particular embodiment of the invention, the second activation element comprises a change of state sensor which measures a change of state under the effect of pressure exerted on said second activation element that causes a movement of at least a part of said second activation element. The second activation element is preferably selected from a group consisting of a push button, a switch or an electrical switch.

According to another embodiment, triggering of said second activation element is arranged to switch on the command system which avoids keeping it in a prolonged power consuming standby.

Preferably the command system is configured to activate a command of the medical device remotely. That is, the command system is located outside the human or animal body and without contact with it. It is thus understood that the command system is not to be implanted and is not implanted in the human or animal body. It is thus provided that the command system comprises at least one radio frequency transmitter configured to communicate wirelessly with the medical device, the radio frequency transmitter being configured to be paired with a radio frequency receiver of said medical device prior to activation of a command of the medical device by the command system.

According to one particular embodiment of the invention, the command system comprises a display indicating the activation of a command of the medical device by the command system.

Preferably, the command system is configured to command a medical device for occluding a natural duct of animal body, the medical device being the human or selected from a group consisting of an artificial sphincter, an artificial muscle, an electrical stimulator, a gastric ring, a neurostimulator or a penile implant.

The invention extends to a medical piece of equipment comprising a command system as defined above and a medical device arranged to be implanted in a human or animal body.

The invention further extends to a method for remotely commanding a medical device arranged to be implanted in a human or animal body, said method comprising at least the steps of:

providing a command system comprising at least a first and a second activation element for remotely commanding said medical device, said first activation element being triggered by proximity to an added activation element, said second activation element being triggered by pressure exerted on said second activation element, activating a command of the medical device upon triggering of the first and second activation elements of the command system.

In one embodiment of the method according to the invention, the command system activates a command of the medical device upon simultaneous triggering of the first and second activation elements, while according to another embodiment the command system activates a command of the medical device upon successive triggering of the first and second activation elements. Preferably, successive triggering of the first and second activation elements is performed in a time interval of less than 1 second, preferably less than 500 milliseconds, still preferably less than or equal to 100 milliseconds.

According to one particular embodiment of the method, the first and second activation elements are disposed at different locations of the command system, preferably on opposite sides of the command system, whereas according to another embodiment the first and second activation elements are disposed at the same location of the command system.

According to another embodiment of the method, said first activation element is equipped with a sensor selected from a group consisting of a tactile, resistive, capacitive, induction, infrared, optical, magnetic or fingerprint recognition sensor. Preferably, the fingerprint recognition sensor recognises at least a first succession of fingerprints to activate a first command of the medical device and at least a second succession of fingerprints to activate a second command of the medical device, the first command being different from the second command.

According to yet another embodiment of the method, said added activation element is provided distinct from the command system and consists of a part of a human or animal body, preferably a finger, or of a stylus or of a badge or chip, in particular magnetic or electromagnetic.

According to one embodiment of the method, said first activation element is triggered by proximity to the added activation element at a distance of less than 5 mm, preferably less than 1 mm. Alternatively, said first activation element is triggered by contact with the added activation element.

In one particular embodiment of the method, said second activation element is equipped with a change of state sensor which measures a change of state under the effect of pressure exerted on said second activation element causing a movement of at least a part of said second activation element.

The second activation element is preferably selected from a group consisting of a push button, a switch or an electrical switch.

In another particular embodiment of the method, the second activation element is triggered to switch on the command system.

Preferably the command system is configured to activate a command of the medical device remotely. The command system thus acts as a remotely command. In particular, the command system is equipped with at least one radio frequency transmitter communicating wirelessly with the medical device and the radio frequency transmitter of the command system is paired with a radio frequency receiver of the medical device prior to activation of a command of the medical device by the command system.

According to another particular embodiment of the method, activation of a command of the medical device by the command system is displayed by means of a display disposed on the command system.

Preferably, a medical device for occluding a natural duct of the human or animal body selected from a group consisting of an artificial sphincter, an artificial muscle, an electrical stimulator, a gastric ring, a neurostimulator or a penile implant is commanded.

BRIEF DESCRIPTION OF THE FIGURES

Further characteristics and advantages of the invention will be apparent from the following detailed description, with reference to the appended drawings in which.

DETAILED DESCRIPTION OF EMBODIMENTS

Figure 1:
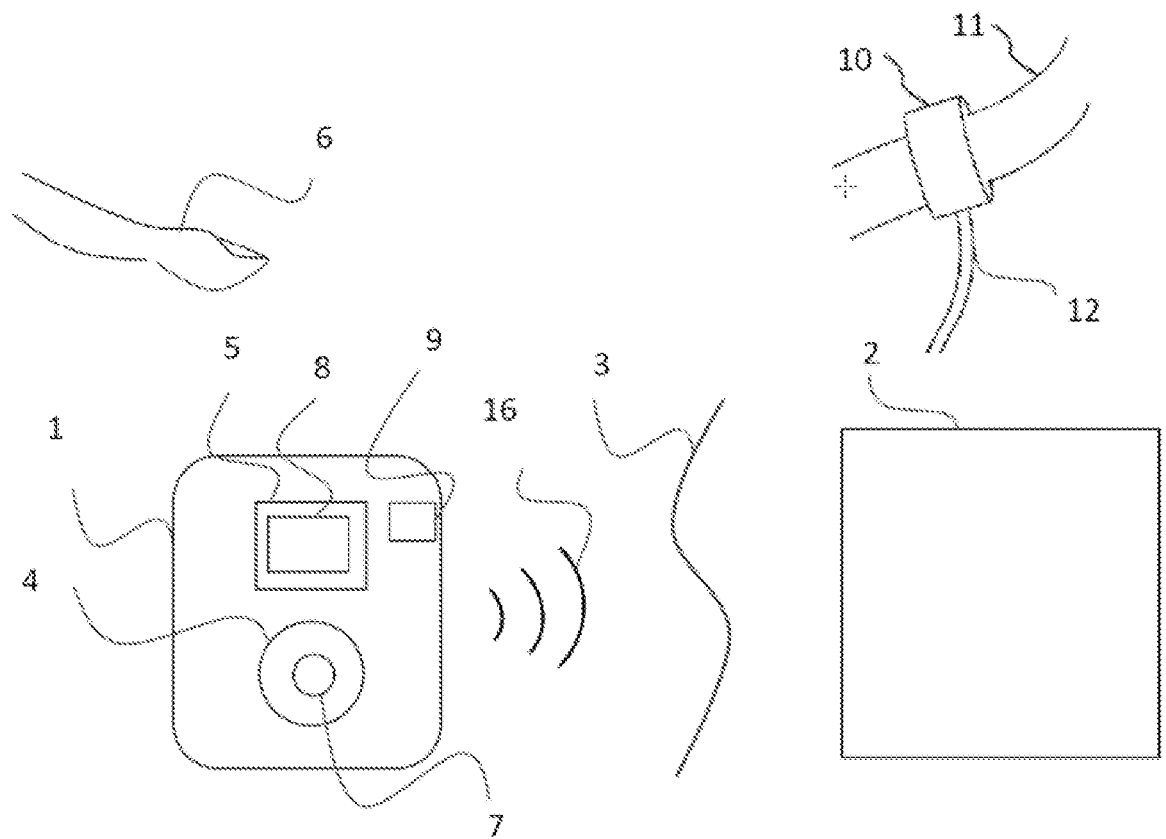
FIG. 1 illustrates a schematic view of the command system according to one embodiment of the invention and of the medical device implanted in a human or animal body.

FIG. 1 schematically illustrates a system 1 for remotely commanding a medical device 2. The medical device 2 is shown implanted in the human or animal body of the patient which is partly represented by reference 3 in FIG. 1 symbolizing the skin of the body. In FIG. 1, it is noted that what is represented to the right of the skin 3 of the human or animal body refers to what is implanted in the body, in this case the medical device 2 which was for example implanted during a surgical operation. To the left of the skin 2 of the human or animal body is therefore that which is not implanted in the body, in this case the command system 1.

According to the invention, the command system 1 comprises a first 4 and a second 5 activation element for commanding the medical device 2. The first activation element 4 is arranged to be triggered by proximity to an added activation element 6, while the second activation element 5 is arranged to be triggered by pressure exerted on said second activation element. The two activation elements are therefore of a different nature, that is they are triggered by different technologies that do not interact with each other, and this has the effect of significantly reducing activations of unintentional commands by the patient, as detailed below.

In particular, the first activation element 4 comprises a proximity or contact sensor 7 selected from a group consisting of a tactile, resistive, capacitive, induction, infrared, optical, magnetic or fingerprint recognition sensor. By "proximity" it is meant that the sensor 7 detects the presence of the added activation element 6 when the latter is at a distance of less than 5 millimetres from the sensor 7, preferably less than 1 millimetre.

This type of sensor 7 measures or detects the presence of an added activation element 6 when it is in proximity to or in physical contact with the sensor, thereby triggering the first activation element. According to the invention, the added activation element 6 is distinct from the command system 1, that is it is not part of it. Preferably, it consists of a part of a human or animal body, for example a finger 6, but it may also be in the form of a stylus or a badge, especially a magnetic or electro-magnetic badge or chip.

In the case of a fingerprint recognition sensor 7, it is provided that the sensor is configured to recognise at least a first succession of fingerprints so as to activate a first command, for example opening of the urethra, and at least a second succession of fingerprints different from the first to activate a second command, for example a request for information on the pressure exerted by the medical device on the natural duct or on the open or sealed state of the duct.

The second activation element 5 comprises in turn a sensor 8 which measures a change of state. In particular, pressure exerted on the second activation element 5 causes a movement of at least a part of said second activation element and thus a change of state for example between a high position and a low position of a part of the second activation element as measured or detected by the sensor 8.

For example, this second activation element 5 is selected from a group consisting of a push button, a switch or an electrical switch. The push button is equipped with a return spring which allows the button to return to its initial position when no more pressure is exerted on it.

Preferably, the first and second activation elements are disposed in a recessed housing so as to avoid the activation of an unintentional command which would be triggered by an added element passing in proximity to the surface of the command system 1. Indeed in this case, it would be necessary for said added element to enter the recess in order to activate a command, as simple contact with the surface would not be sufficient.

In the embodiment illustrated in FIG. 1, the first 4 and second 5 activation elements are disposed at different locations of the command system. In the example shown in FIG. 1, the command system 1 is substantially parallelepiped in shape so that the first 4 and second 5 activation elements are disposed on a same side of the command system 1, juxtaposed to each other.

Alternatively, the first 4 and second 5 activation elements are disposed on opposite sides of the command system 1. Advantageously, this s embodiment allows the user to activate a command of the implanted medical device 2 by contact of a finger, for example the index finger, with the first activation element 4 and by pressure of another finger, for example the thumb or the middle finger, on the second activation element 5. This embodiment has a particular ergonomics adapted to triggering of the first and second activation elements by the fingers of one hand, since in this case the command device 1 is held easily and firmly between the thumb and the index or middle finger.

Still alternatively, but not illustrated, the first 4 and second 5 activation elements are disposed at the same location on the command device 1 so that they overlap and thus only one activation element is visible to the user. This configuration has the advantage of allowing the first and second activation elements to be triggered and thus a command of the medical device to be activated by means of a single action of the patient.

The command system 1 further comprises a display 9 which indicates, for example by means of a light signal, that the activation of a command by the command system 1 has been taken into account and that, for example, the command consisting in opening an anatomical duct will be performed by the medical device 2.

For this purpose and in the particular exemplary embodiment of the artificial urinary sphincter, it is provided that the medical device 2 comprises at least one inflatable occlusive cuff 10 surrounding the natural duct 11, the urethra in this case, and a tubular fluid connection 12, one end of which is connected to the cuff 10 to create a fluid connection with the rest of the medical device 2.

In particular the medical device 2 also includes a control unit and a pump (not shown for clarity), the pump itself including a variable volume reservoir. The pump reservoir is filled with fluid and connected to the other end of the tubular fluid connection 12. Thus the pump reservoir, the tubular fluid connection 12 and the occlusive cuff 10 form a single fluid circuit, whereby fluid can be transferred bidirectionally from the reservoir to the pump.

In operation, the unit controls the pump so as to increase or decrease the volume of fluid in the reservoir and hence the amount of fluid in the cuff 10 via the fluid circuit. This arrangement has the effect of allowing the cuff to be inflated or deflated, increasing or decreasing the compression exerted and thus compressively sealing or releasing the urethra 11 thereby preventing urine leakage for patients suffering from incontinence.

The medical device 2 including the occlusive cuff 10, the tubular fluid connection 12, the command unit, the pump and the reservoir are therefore implanted in the human or animal body (to the right of skin 3 in FIG. 1) to be remotely commanded by the command system 1 located outside the body (to the left of skin 3 in FIG. 1).

Furthermore, it is contemplated according to the invention that the command of the medical device 2 may consist in an activation or a deactivation of the device, for example to implement a particular mode of operation of the device, to configure its inner parameters or even to request information from the device, for example so as to know the state of the device, in particular the state of charge of the device's energy source.

Figure 2:
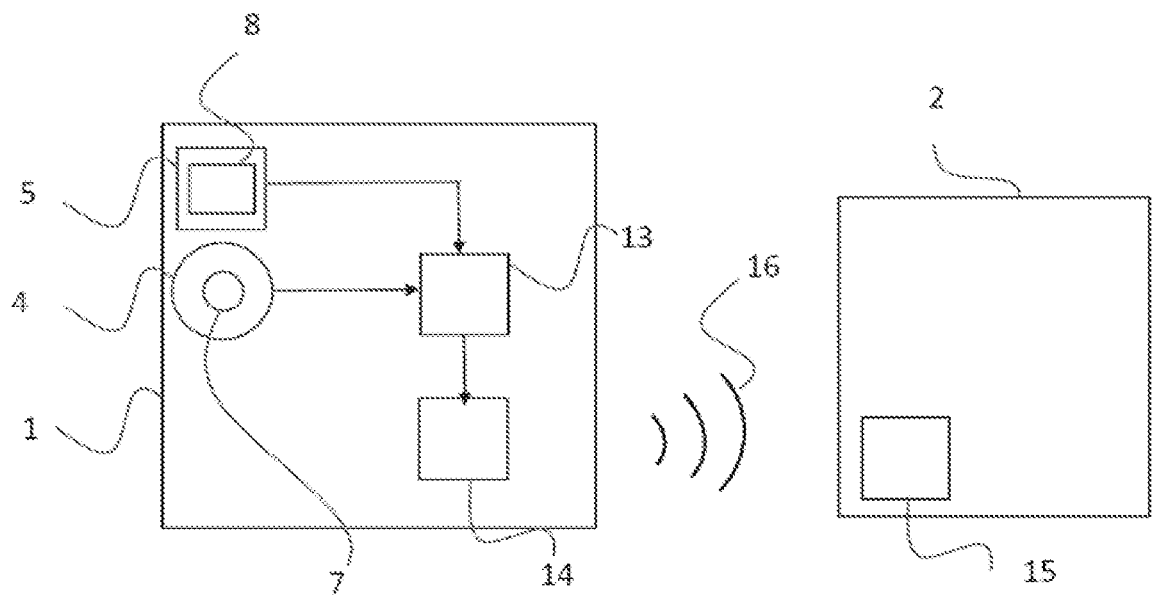
FIG. 2 illustrates a view of the architecture of the command system according to the invention.

FIG. 2 shows the detailed architecture of the command system 1 and its general operation in connection with the medical device 2.

In particular, the command system 1 comprises a proximity sensor 7 associated with the first activation element 4, a change of state sensor 8 associated with the second activation element 5, a control/command unit 13 and a transmitter/receiver 14 of radio frequency signals 16.

The control/command unit 13 is connected to the first 4 and second 5 activation elements and to the transmitter/receiver 14. It is therefore capable of receiving from the first activation element 4 a trigger signal indicating that an added activation element 6, for example the finger of a hand, has been detected in proximity to or in contact with the proximity sensor 7. Similarly, the control/command unit 13 is capable of receiving a trigger signal from the second activation element 5 indicating that pressure has been exerted on the change of state sensor 8.

Upon receipt of the trigger signals from the first 4 and second 5 activation elements, the control/command unit 13 processes the trigger signals and determines a command activation signal for the medical device 2 which is transmitted to the transmitter/receiver 14.

The transmitter/receiver 14 receiving the command activation signal transmits a radio frequency signal 16 to the transmitter/receiver 15 of the medical device 2. This signal is then sent by the transmitter/receiver 15 to the (non-illustrated) control unit of the medical device 2 to be processed and for commanding the opening of the urethra 11 in the exemplary embodiment of an artificial urinary sphincter as explained above.

Prior to activation of a command of the medical device 2 by the command system 1 and prior to radio frequency communication between the command system 1 and the medical device 2, pairing of the transmitter/receiver 14 of the command system with the transmitter/receiver 15 of the medical device 2 is preferably provided.

According to one particular embodiment of pairing between the transmitters/receivers 14 and 15, the command system 1, equipped with a barcode reader, reads the pairing code of the medical device 2 disposed, for example, on the packaging of the medical device in the form of a barcode. This pairing code constitutes a secret key that authorizes communication between the two transmitters/receivers.

This pairing step makes it possible to establish a secure communication but also to ensure that the patient commands and communicates with the right medical device. Indeed, given the range of the radio frequency transmitters/receivers, which is typically a few metres, if several medical devices are in proximity to the command system, without the pairing step, there would be a risk of confusion leading to communication with a medical device different from the one with which it is desired to communicate.

At the end of the pairing step, the command system 1 and the medical device 2 are configured to communicate securely together and the command system 1 is capable of activating a command of the medical device 2.

Preferably, the frequency band for communication between the two transmitters/receivers 14 and 15 is a dedicated frequency band reserved for medical devices, distinct from the frequency band intended for consumer applications, thus ensuring communication security between the command system and the implanted medical device and avoiding the activation of a command that would not originate from the patient's command system 1.

Figure 3:
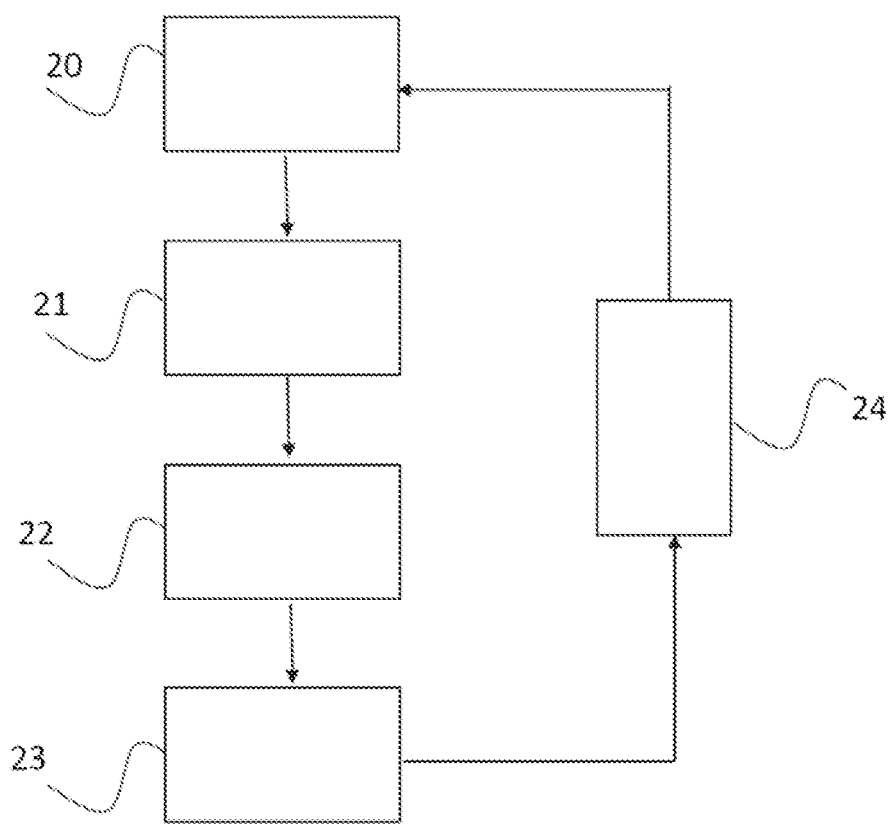
FIG. 3 schematically illustrates the activation of a command of the medical device by the command system.

In connection with FIG. 3, an exemplary embodiment of the method for activating a command of the medical device will now be detailed.

According to this particular exemplary embodiment, in which the command system is in an initial switched off state, the patient triggers the second activation element 5, for example a push button, in step 20 by exerting pressure on it with a finger which has the effect according to the invention of switching on the command system 1 in step 21.

Advantageously, this switching on step saves energy when the system is off.

Once switched on and in a configuration according to which the first 4 and second 5 activation elements are disposed at the same location on the command device 1, the finger still positioned on the second 5 activation element triggers the first activation element 4 in step 22.

Successive triggering of the first 4 and second 5 activation elements, preferably in a time interval of less than 100 milliseconds, results in the activation of a command of the medical device 2 in step 23.

The command system 1 communicates with the medical device 2 as described above and activates a command consisting, for example, in exerting a decrease in the pressure of the cuff 10 on the natural duct 11.

It is provided that the acknowledgement of a command and its execution by the medical device 2 is indicated on the command system 1 by means of a display with a light display, for example of the light-emitting diode LED type.

Following the activation of the command in step 23, a timer of the command system 1 is started in step 24 which counts the time before the system 1 is switched off again.

Alternatively, it is contemplated that the command system 1 is permanently on. In this case, and in a configuration in which the activation elements 4 and 5 are arranged at different locations on the system 1, then simultaneous triggering of the activation elements 4 and 5 will result in the activation of a command.

To save energy, the medical device can be automatically switched off outside the activation phases. Communication with the command system therefore requires a prior wake-up (switch on) of the medical device. Such a wake-up can be implemented by a continuous (loop) communication attempt by the command system after it has been activated by triggering the two activation elements. Wake-up of the medical device may be indicated on the command system by the display mentioned above, for example by the lighting of a LED. To implement such a wake-up function, the command system may comprise two antennas with different polarizations adapted to switch on the medical device. By virtue of these two polarizations, communication between the command system and the medical device is improved for different relative positions and/or orientations of the command system and the medical device. As long as communication is not established between the command system and the medical device, the user manipulates the command system in different positions and/or orientations until the display of the command system indicates that the medical device has been awakened. An advantage of this configuration of the command system is that wake-up of the medical device requires only one triggering of the activation elements of the command system, and the pairing time is thus reduced.

It is understood that the embodiments described above are particular and non-limiting examples and that various modifications may be made without departing from the invention.

The invention claimed is:

1. A command system for remotely commanding a medical device arranged to be implanted in a human or animal body, said command system comprising:
   at least a first and a second activation element for commanding said medical device,
   the first activation element being arranged to be triggered by proximity to an added activation element,
   the second activation element being arranged to be triggered by pressure exerted on said second activation element,
   the command system being arranged to activate a command of the medical device upon successive triggering of the first and second activation elements performed in a time interval of less than 1 second,
   the command system comprising at least one radio frequency transmitter configured to communicate wirelessly with the medical device, the radio frequency transmitter being configured to be paired with a radio frequency receiver of said medical device prior to activation of a command of the medical device by the command system.

2. The command system according to claim 1, wherein the command system is arranged to activate a command of the medical device upon successive triggering of the first and second activation elements performed in a time interval of less than 500 milliseconds.

3. The command system according to claim 1, wherein the first and second activation elements are disposed at different locations of the command system.

4. The command system according to claim 1, wherein the first and second activation elements are disposed at a same location of the command system in a manner as to overlap.

5. The command system according to claim 1, wherein the first activation element comprises a sensor selected from the group consisting of: tactile, resistive, capacitive, induction, infrared, optical, magnetic and fingerprint recognition sensors.

6. The command system according to claim 1, wherein the first activation element comprises a fingerprint recognition sensor configured to recognise at least a first succession of fingerprints to activate a first command of the medical device and at least a second succession of fingerprints to activate a second command of the medical device, the first command being different from the second command.

7. The command system according to claim 1, wherein the first activation element is arranged to be triggered by proximity to the added activation element, and said added activation element is distinct from the command system and chosen from a part of a human or animal body.

8. The command system according to claim 1, wherein said first activation element is arranged to be triggered by proximity to the added activation element at a distance of less than 5 millimetres.

9. The command system according to claim 1, wherein the first activation element is arranged to be triggered by contact with the added activation element.

10. The command system according to claim 1, wherein the second activation element comprises a change of state sensor which measures a change of state under the effect of pressure exerted on the second activation element in a manner that at least a part of said second activation element moves.

11. The command system according to claim 1, wherein the second activation element is selected from a group consisting of a push button, a switch and an electrical switch.

12. The command system according to claim 1, wherein triggering of the second activation element is arranged to switch on the command system.

13. The command system according to claim 1, configured to activate a command of the medical device remotely, outside the human or animal body and without contact with the human or animal body.

14. The command system according to claim 1, further comprising at least one radio frequency transmitter configured to communicate wirelessly with the medical device.

15. The command system according to claim 14, wherein the radio frequency transmitter is configured to be paired with a radio frequency receiver of the medical device prior to activation of a command of the medical device by the command system.

16. The command system according to claim 1, further comprising a display indicating activation of a command of the medical device by the command system.

17. The command system according to claim 1, configured to command a medical device for occluding a natural duct of the human or animal body.

18. The command system according to claim 1, configured to command a medical device arranged to be implanted in a human or animal body and selected from a group consisting of an artificial sphincter, an artificial muscle, an electrical stimulator, a gastric ring, a neurostimulator and a penile implant.

19. A piece of medical equipment comprising a medical device arranged to be implanted in a human or animal body and a command system for remotely commanding the medical device, said command system comprising:
   at least a first and a second activation element for commanding the medical device,
   the first activation element being arranged to be triggered by proximity to an added activation element,
   the second activation element being arranged to be triggered by pressure exerted on said second activation element,
   for activating a command of the medical device upon successive triggering of the first and second activation elements performed in a time interval of less than 1 second, the command system comprising at least one radio frequency transmitter configured to communicate wirelessly with the medical device, the radio frequency transmitter being configured to be paired with a radio frequency receiver of said medical device prior to activation of a command of the medical device by the command system.

20. A command method for remotely commanding a medical device arranged to be implanted in a human or animal body, the command method comprising at least the steps of:
providing a command system comprising at least a first and a second activation element for remotely commanding said medical device, said first activation element being triggered by proximity to an added activation element, said second activation element being triggered by pressure exerted on said second activation element,
activating a command of the medical device upon successive triggering of the first and second activation elements of the command system performed in a time interval of less than 1 second,
the command system comprising at least one radio frequency transmitter configured to communicate wirelessly with the medical device, the radio frequency transmitter being configured to be paired with a radio frequency receiver of said medical device prior to activation of a command of the medical device by the command system.

21. The command method according to claim 20, wherein the command system activates a command of the medical device upon simultaneous triggering of the first and second activation elements.

22. The command method according to claim 20, wherein said added activation element is provided distinct from the command system.

23. The command method according to claim 20, wherein said first activation element is triggered by proximity to the added activation element at a distance of less than 5.

24. The command method according to claim 20, wherein said first activation element is triggered by contact with the added activation element.

25. The command method according to claim 20, wherein said second activation element is equipped with a change of state sensor which measures a change of state under the effect of pressure exerted on said second activation element which moves at least a part of said second activation element.

26. A command system for remotely commanding a medical device arranged to be implanted in a human or animal body, said command system comprising:
at least a first and a second activation element for commanding said medical device, the first activation element being arranged to be triggered by proximity to an added activation element,
the second activation element being arranged to be triggered by pressure exerted on said second activation element,
the command system being configured for establishing a communication with the medical device in a frequency band reserved for medical devices and for activating a command of the medical device upon successive triggering of the first and second activation elements of the command system performed in a time interval of less than 1 second, the command system comprising at least one radio frequency transmitter configured to communicate wirelessly with the medical device, the radio frequency transmitter being configured to be paired with a radio frequency receiver of said medical device prior to activation of a command of the medical device by the command system.

* * * * *